Aug. 8, 1939.   J. H. GOULD   2,168,567
BRAKE LEVER SAFETY DEVICE
Filed July 12, 1937
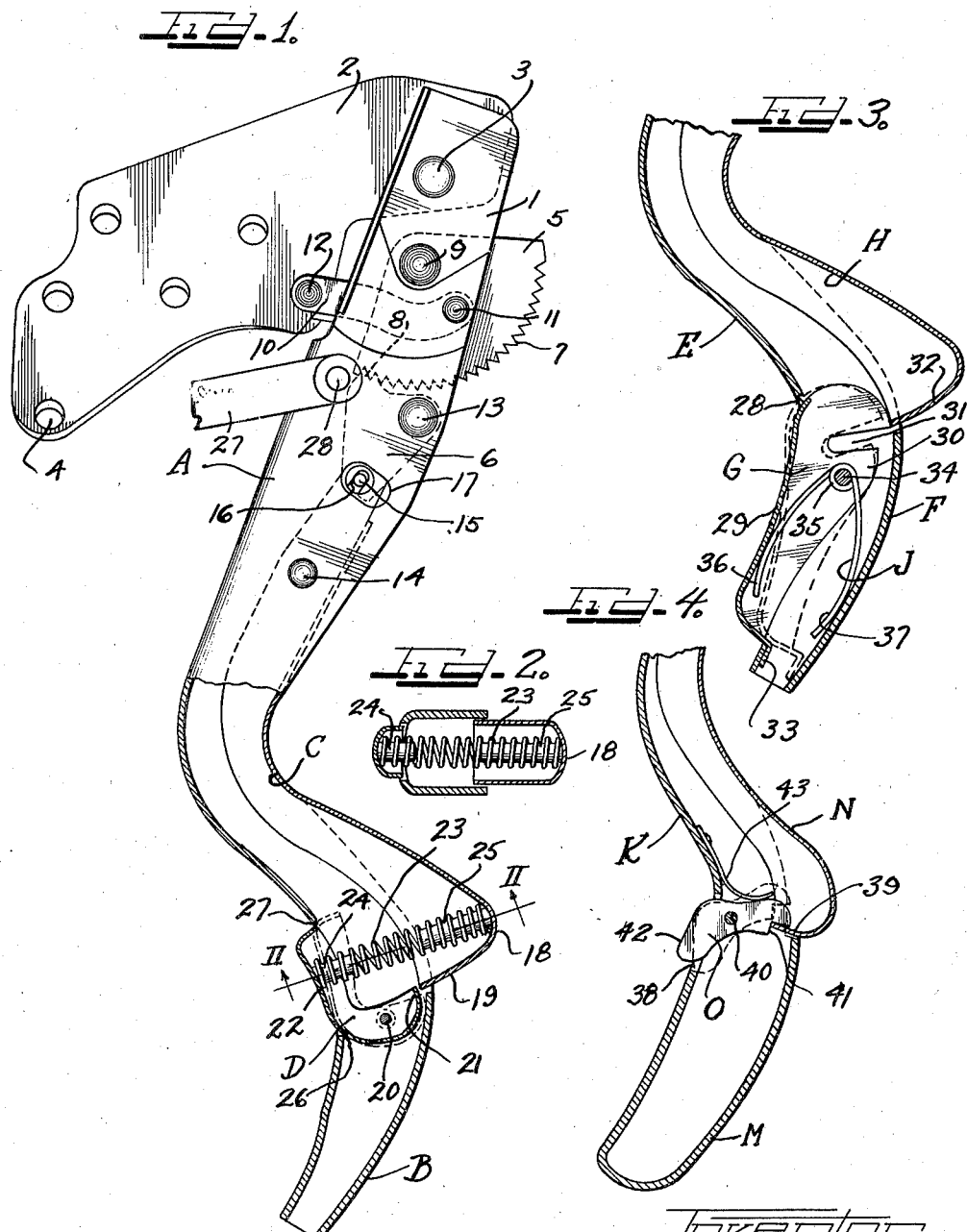
Inventor
JAY H. GOULD.
by Patented Aug. 8, 1939

2,168,567

UNITED STATES PATENT OFFICE 2,168,567

BRAKE LEVER SAFETY DEVICE

Jay H. Gould, Detroit, Mich., assignor, by mesne assignments, to Houdaille-Hershey Corporation, Detroit, Mich., a corporation of Michigan Application July 12, 1937, Serial No. 153,117

5 Claims. (Cl. 74—537)

The present invention relates to a brake lever safety device and is concerned more particularly with a device to prevent accidental release of a brake lever when the same is in adjusted position.

The invention will be illustrated and described as applied to an emergency brake lever of the dash type for use with automotive vehicles.

In connection with the use of brake levers of the dash type, experience has demonstrated that oftentimes such levers, when moved to brake setting position, have been accidentally released by a driver entering or leaving the front seat of a vehicle, and striking the clutch release member of the brake by his knee or some other part of his body. Such accidental release of the brakes oftentimes results in accidents.

The purpose of the present invention is to provide means for preventing accidental release of a brake lever when in adjusted position.

Another object of the present invention is to provide a brake lever construction wherein a manually operable dog is utilized to normally lock the brake release member against displacement from its normal position.

A further object of the present invention is to provide a safety device for brake levers to prevent accidental release of the lever.

A still further object of the present invention is to provide a brake lever construction utilizing a safety device to prevent accidental release of the brake release member and which release member is maintained in one position and the clutching members of the lever in clutching engagement by the position of a dog normally active to prevent actuation of the clutch release member of the brake.

The above, other and further objects of the present invention will be apparent from the following description and accompanying drawing.

The accompanying drawing illustrates embodiments of the present invention and the views thereof are as follows:

Figure 1 is a view, partially in side elevation, and partially in section, of a stamped brake lever arranged as an automotive emergency brake of the dash type, showing the clutching members in clutching engagement and the safety dog, in full lines in operative or blocking position, and in dotted lines in inoperative or unblocking position.

Figure 2 is a transverse sectional view taken substantially in the plane indicated by line II—II of Figure 1.

Figure 3 is a fragmental portion of the grip end of a stamped lever, showing another form of locking dog for the clutch release member of the brake.

Figure 4 is a fragmental sectional view of a stamped lever, showing a still further form of locking dog for the clutch release member of the brake.

The drawing will now be explained:

In Figure 1 is illustrated a stamped brake lever 10 including a shaft A and a grip portion B, fashioned from flat metal to provide a shaft which is substantially U-shaped in section for a major portion of its length. The side walls of the shaft, at one end, are extended to provide parallel legs 1 for straddling a plate support 2 and for pivotal connection at 3 to the support. The support is provided with apertures 4 for receiving rivets or bolts to attach it in position behind the instrument board of an automotive vehicle as is usual practice with dash type levers.

The grip portion B is closed and shaped to provide a comfortable grip for the operator's hand.

In this form of the invention, the clutch members include a floating sector 5 and a pawl 6 arranged for clutching engagement to secure the lever in adjusted position.

The floating sector 5 is provided on an arcuate edge thereof with a plurality of ratchet teeth 7, and the pawl 6 is provided with a cooperating point 8 to engage any one of the teeth of the ratchet. The floating sector 5 is pivoted at 9 to the legs 1 of the lever shaft and is given rocking movement about its pivot by means of a link 10 which is pivoted at one end as at 11 to the floating sector, and at the other end as at 12 to the support 2.

The pawl 6 is pivoted at 13 between the walls of the U-shaped portion of the shaft, adjacent the sector 5.

A clutch release member C is stamped from flat metal and is of U-shape in section for a major portion of its length and pivoted at 14 to the lever shaft A. The clutch release member C is shown as working within the side walls of the U-shaped shaft A, with the walls of the shaft and the walls of the release member C overlapped.

Any convenient manner of connecting the release member C and pawl 6 may be used.

The connection illustrated includes a pin 15 passing through the side walls of the release member C, and an elongated opening 16 in the pawl. The side walls of the shaft A are apertured at 17 to enable application of the pivotal connection, after the pawl and release member are pivotally connected to the shaft.

Adjacent the grip portion B of the shaft A, the release member C has a part 18 which may be engaged by the thumb or finger of an operator, as he grasps the grip portion B of the lever shaft, to rock the release member C on its pivot in a direction to separate the clutch members from clutching engagement. This end of the clutch release member C is shown as formed with an end wall 19 which works within the side walls of the shaft adjacent the grip portion B as the release member C is rocked on its pivot.

A latching dog D, formed of stamped metal, substantially U-shaped in cross-section, and in Figure 1 illustrated as substantially L-shaped in elevation, is pivoted at 20 to the lever shaft and has a wall part 21 movable against and away from the adjacent edge of the end wall 19 of the release member D. The dog D has a wall portion 22 which may be clasped by a finger or by fingers of the operator to rock the dog about its pivot to unlatch it with respect to the release member C.

In order to maintain the dog D in latching position to prevent accidental displacement of the release member C, spring means are provided.

Also to normally maintain the latch release member C in one position and the clutch member 8 in clutching engagement with its companion member 5, spring means are provided.

In the form of the invention illustrated in Figure 1, a single spring 23 is utilized for the purposes mentioned.

The spring 23 is shown as having one end engaged about a pin 24 welded or otherwise secured to the inner face of the web of the dog D, and its other end fastened about a pin 25 which is welded or otherwise secured to the web of the release member C, the pins 24 and 25 being in alignment. The spring 23 is put under tension when installed so that its normal effect is to rock the dog D in counterclockwise direction, as viewed in Figure 1 and likewise to rock the adjacent end of the release member C in counterclockwise direction.

In order to limit rocking movement of the dog D in counterclockwise direction, it is so positioned in the grip portion of the lever shaft as to abut at 26 a portion of the rear part of the grip portion as a stop. The lever shaft is cut away along its web as at 27 to afford a space within which the dog D may rock in use.

Normally, the spring 23 acts against the dog D to maintain it in latched position with respect to release member C and to maintain the release member C in one position and because of its connection to the clutch member or pawl 6 maintains the clutch members in clutched engagement.

The lever illustrated in Figure 1 shows the parts with the lever in "off" position.

To move the lever in a manner to apply the brakes, the operator grasps the grip portion B and swings the lever in counterclockwise direction about its pivot 3. During such movement, the point or tooth 8 of the pawl 6 will click over the ratchet teeth 7 of the sector 5 and during such movement the sector 5 will be given swinging movement about its pivot 9 in angular direction counter to the angular direction of the lever.

When the lever has been moved to desired position, the action of the spring 23 will urge the tooth or point 8 of the pawl 6 into latched or clutched engagement with a tooth of the ratchet thus securing the lever in adjusted position. The spring 23 at the same time functions to maintain the dog D in latched position with respect to the adjacent end of the clutch release member C and thus prevent actuation of the clutch release member C by any force striking it in such direction as to tend to rock it about its pivot in clutch releasing direction.

When it is desired to release the brake and move it to "off" position, the operator squeezes the portion 22 of the dog D, rocking it about its pivot 20 in clockwise direction, which movement displaces the wall 21 from against the end wall 19 of the release member C whereupon this end of the release member C may be moved inwardly or rocked in clockwise direction to disengage the clutch members 6 and 5.

For establishing connection between the lever shaft A and the brake rigging of an automotive vehicle, a yoke 27 is pivoted at 28 to the shaft.

In the form of the invention illustrated in Figure 3, a lever shaft E is formed as a stamping, preferably of U-shaped configuration throughout a major portion of its length, and with a grip portion F, the latter being provided with an elongated slot 28 in its rear or pressure side.

A latching dog G is stamped from flat metal to provide a web 29 and side walls 30, only one of which is shown in the drawing. The walls 30 are preferably parallel and are formed with notches 31 to receive the adjacent end wall 32 of the clutch release member H, which is suitably pivoted to the shaft E. The major portion of the length of the dog G extends through the slot 28 in the rear side of the grip portion of the lever and at its lower end is provided with a stop 33 acting against the inner surface of the rear portion of the grip to limit outward movement of this end of the dog.

The dog G is pivotally connected to the walls of the grip portion of the lever by a pivot pin 34 passing through the side walls of the dog.

A wish bone spring J is supported on the pivot 34 by a looped portion 35 and with leg portions 36 and 37 lying respectively against the web of the dog G and the inner surface of the front portion of the grip F of the lever shaft and acts normally to maintain the dog G in latched relation with respect to the clutch release member H, as shown in full lines in Figure 3, i. e., in blocking relation with respect to the wall 32.

The spring J normally urges the dog into latching relation with respect to the clutch release member H thereby maintaining this member in one position and also maintaining the clutch member operatively connected with the release member H, in clutching engagement with its companion clutch member.

To manipulate this form of dog, the operator grasps the wall 29 of the dog and swings it in counterclockwise direction about its pivot to move the slot 31 into register with the end wall 32 of the clutch release member 8 whereupon this member may be actuated to move it in a direction to release the clutched engagement of the clutch member of the lever.

In the form of the invention illustrated in Figure 4, a stamped lever shaft K has a grip portion M which is substantially closed as shown, with a slot 38 formed in its rear or pressure surface.

A clutch release member N is suitably pivoted to the shaft K and is formed with an end wall portion 39 adjacent the grip portion M of the lever shaft, arranged to work between the side walls of the shaft adjacent the grip.

A latching dog O is pivoted at 40 to the grip portion of the lever. This dog is preferably blanked from flat stock to provide a shoulder 41 to engage the extremity of the inturned end or wall 39 of the clutch release member N and also has a thumb portion 42 which projects outwardly of the grip portion of the lever. A spring 43 acts against the dog O in a manner to normally maintain it in latched engagement with the clutch release member N and thus prevent accidental movement of the release member in a direction to release the lever from its adjusted position.

The spring 43 functions to maintain the dog O in latched engagement with the release member N and, consequently, serves to maintain the clutch release member N in one position and its connected clutch member in clutching engagement with its mating clutch member.

The invention has been illustrated and described herein in connection with levers for automotive vehicles although it is to be understood that the invention is not limited to such use, it being susceptible of general application to levers of various types where it is found expedient to latch the clutch release member against accidental displacement.

The invention has also been illustrated herein with a single spring for actuating the latch dog and through it the maintenance of the clutch release member in one position and its connected clutch member in clutching engagement with its cooperative member.

It is to be understood that separate springs might be utilized for this purpose if so desired.

The invention has been described herein more or less precisely as to details, yet it is to be understood that the invention is not to be limited thereby as changes may be made in the arrangement and proportion of parts and equivalents may be substituted, without departing from the spirit and scope of the invention.

The invention is claimed as follows:

1. A brake lever construction including a support, a lever shaft formed as a stamping of substantially U-shape for a major portion of its length pivoted at one end to said support and provided at its other end with a grip portion, means providing cooperating clutch members, one of which is pivoted to said lever shaft, a stamped clutch release member of U-shape in section for a major part of its length pivoted to said lever shaft and having an end wall adjacent the grip portion of the lever shaft, a dog pivoted to said lever shaft adjacent the grip portion thereof and arranged normally to latch with the margin of the end wall of said release member, and a spring connected between said dog and said release member for normally maintaining said dog in latched engagement with said release member and for maintaining said clutch members in clutching engagement.

2. A brake lever construction including a support, a lever shaft formed as a stamping of substantially U-shape for a major portion of its length pivoted at one end to said support and provided at its other end with a hollow grip portion, means providing cooperating clutch members, one of which clutch members is carried by said lever shaft, a stamped clutch release member of U-shape in section for a major portion of its length pivoted to said lever shaft and having a wall portion entered within said lever shaft adjacent the grip portion, and a dog pivoted within said hollow grip portion and spring urged to normally engage said wall portion to block actuation of said release member in brake release direction and for maintaining said clutch members in clutching engagement.

3. A brake lever construction including a support, a lever shaft pivoted at one end to said support and provided at its other end with a hollow grip portion, means providing cooperating clutch members at least one of which is carried by said lever shaft, a clutch release member pivoted to said lever shaft and having a wall portion entered within said lever shaft adjacent the hollow grip portion, and a dog pivoted within said hollow grip portion and spring urged to normally engage said wall portion to block actuation of said release member in brake release direction and for maintaining said clutch members in clutching engagement.

4. In a handbrake lever utilizing clutch release means carried by the lever shaft for disengaging the normally engaged clutching members which hold the lever in adjusted position, characterized by a clutch releasing member having a part constituting a wall entered within said lever shaft and movable therein with rocking action, and further characterized by a blocking member pivoted to said lever shaft for rocking movement in the plane of the direction of the length of the lever shaft and spring urged to a position to normally engage said wall to prevent actuation of said clutch releasing means to disengage said clutch members.

5. A handbrake lever provided with clutch member release mechanism, said mechanism including a part rockably mounted on the lever and having a wall portion extending into the lever, and a blocking member pivoted to the lever and spring urged to a position to normally engage said wall to prevent rocking of said part.

JAY H. GOULD.